(12) United States Patent
Seder

(10) Patent No.: US 8,373,842 B1
(45) Date of Patent: Feb. 12, 2013

(54) PRAXINOSCOPE KIT AND ASSEMBLY METHOD

(76) Inventor: Rufus Butler Seder, Arlington, MA (US)

( * ) Notice: Subject to any disclaimer, the term of this patent is extended or adjusted under 35 U.S.C. 154(b) by 60 days.

(21) Appl. No.: 13/099,796

(22) Filed: May 3, 2011

Related U.S. Application Data

(60) Provisional application No. 61/330,413, filed on May 3, 2010.

(51) Int. Cl.
*G03B 25/00* (2006.01)

(52) U.S. Cl. ........................................................ 352/101

(58) Field of Classification Search ............... 352/87, 352/54, 101, 102, 43; 40/421, 493, 427, 40/446
See application file for complete search history.

(56) References Cited

U.S. PATENT DOCUMENTS

| | | | |
|---|---|---|---|
| 29,430 A | 7/1860 | Ames | |
| 64,117 A * | 4/1867 | Lincoln | 352/101 |
| 697,907 A | 4/1902 | Wilder, Jr. | |
| 1,014,365 A * | 1/1912 | Bourgin | 352/101 |
| 1,214,636 A * | 2/1917 | Zinn | 352/101 |
| 1,804,260 A | 5/1931 | Kerr | |
| D180,372 S | 5/1957 | Morgan | |
| 2,959,872 A | 11/1960 | Rodgers | |
| 2,985,057 A * | 5/1961 | Morgan | 352/2 |
| 5,905,564 A * | 5/1999 | Long | 352/98 |
| 6,097,468 A * | 8/2000 | Muehlenhard | 352/101 |
| 6,385,875 B1 | 5/2002 | Santorsola | |
| 6,781,761 B2 | 8/2004 | Raymond | |
| 6,886,280 B2 | 5/2005 | Spodek et al. | |
| 7,331,132 B1 | 2/2008 | Seder | |
| 2009/0141241 A1 | 6/2009 | Buyssens | |

OTHER PUBLICATIONS

Animation Praxinoscope, www.scientificsonline.com/animation-praxinoscope.html web page, Edmund Scientific's, Tonawanda, NY, USA.
Gomorrans Praxinoscope, www.youtube.com, Gomorrans Praxinoscope from 'Giving Birth to Love' LP Side A, 2009, Gomorrans Social Aid & Pleasure Club.

* cited by examiner

*Primary Examiner* — William C Dowling
(74) *Attorney, Agent, or Firm* — O'Connell Law Firm; Thomas P. O'Connell

(57) ABSTRACT

A kit of parts and method for forming a praxinoscope with a base, an outer wall to be secured to the base in a cylindrical configuration, and a mirrored inner wall to be secured to the base in a faceted, substantially cylindrical configuration concentric with the outer wall. Image strips with sequential images disposed thereon can be disposed within the outer wall, and an axle member concentrically disposed through the base and the upper panel permits a rotation of the praxinoscope to produce animation. The inner and outer walls can be secured to the base by teeth that project from their lower longitudinal edges in combination with inner and outer rings of apertures disposed in ring shapes in the base. An upper panel can be similarly retained atop the inner wall. Notches at the proximal ends of the teeth can positively engage the apertures in the base.

24 Claims, 9 Drawing Sheets

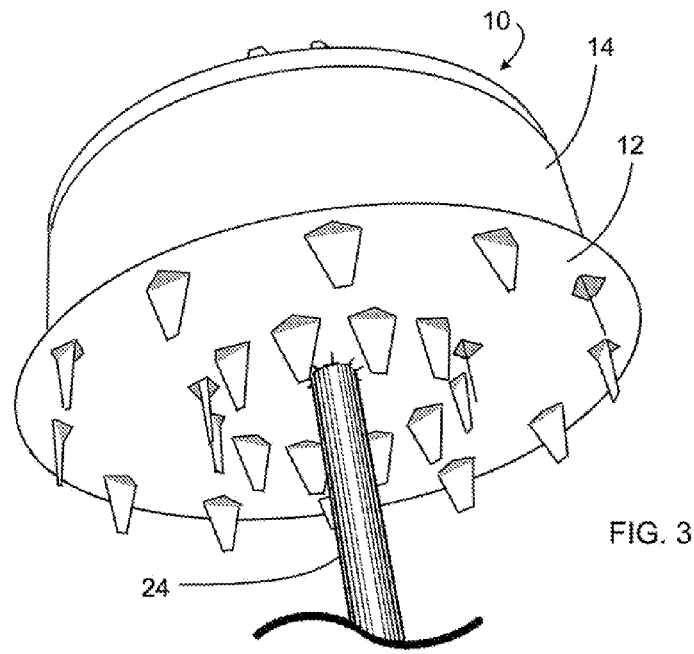
FIG. 3
FIG. 4
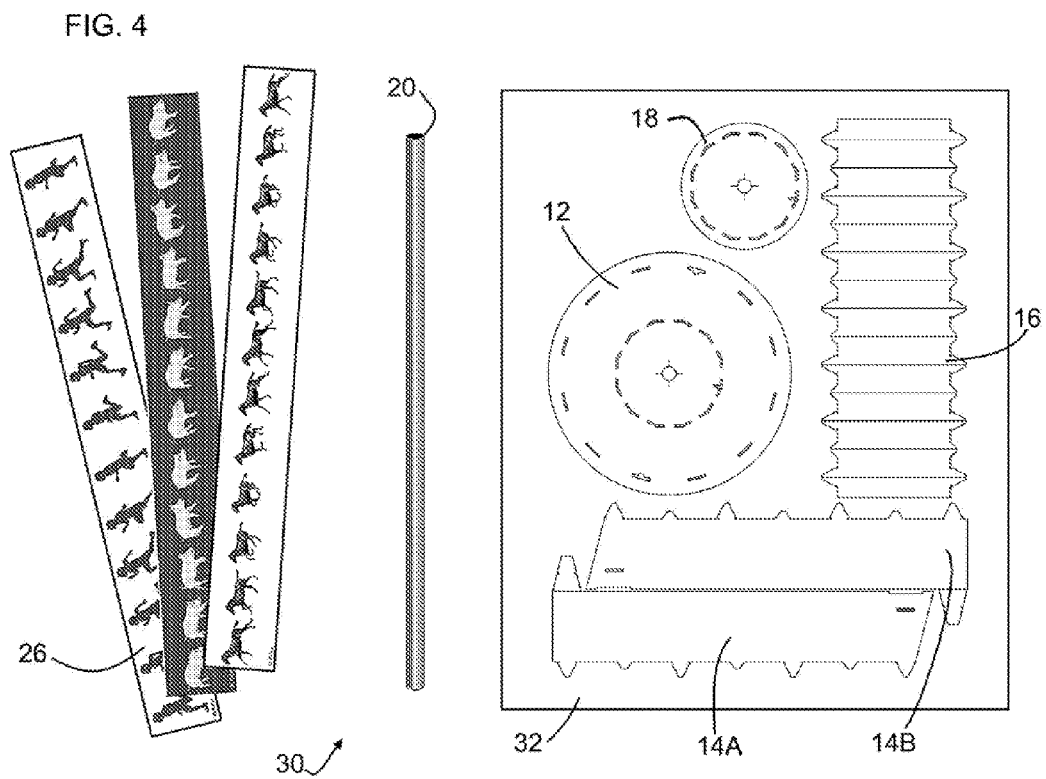

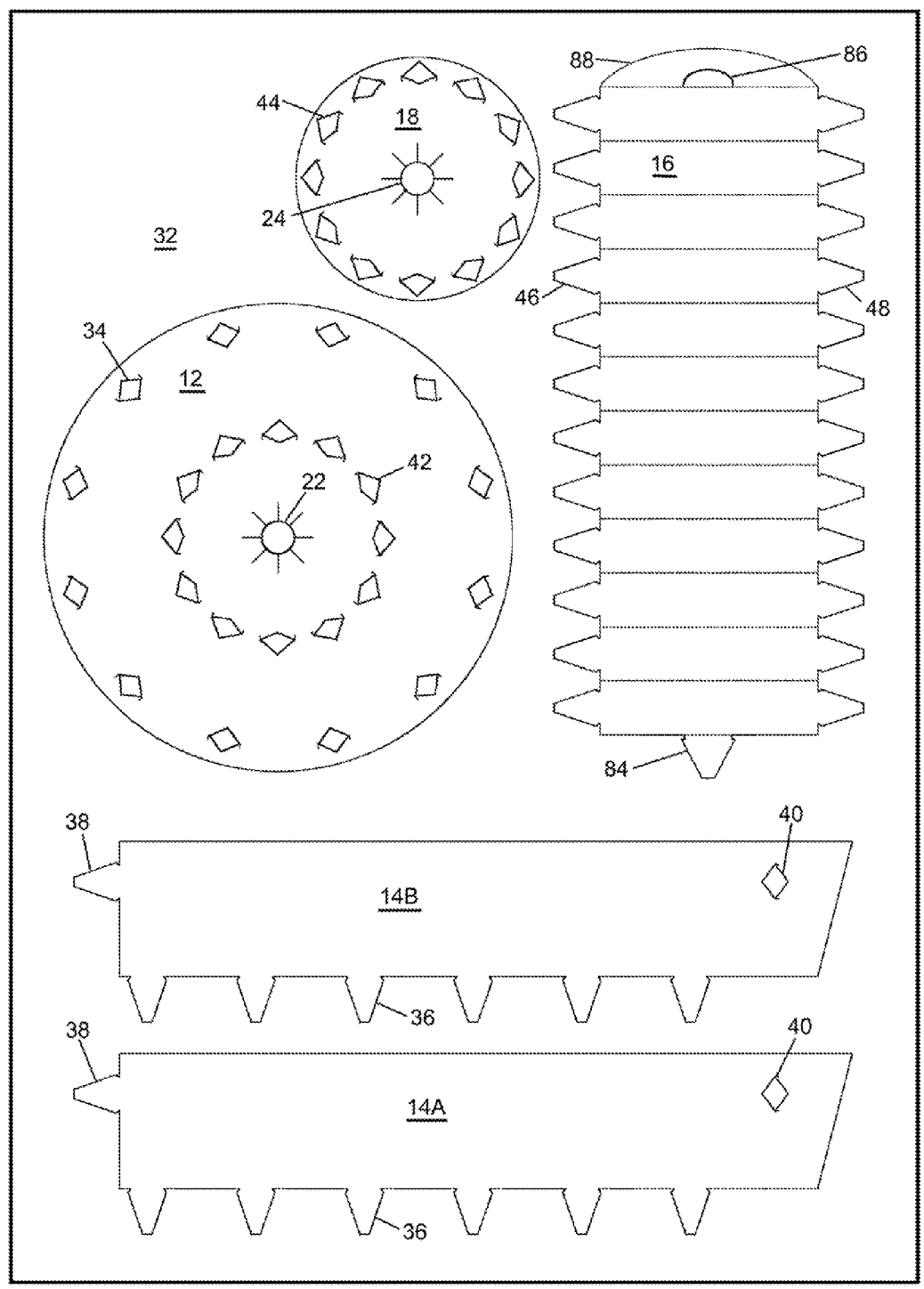

PRAXINOSCOPE KIT AND ASSEMBLY METHOD

FIELD OF THE INVENTION

The present invention relates generally to animation devices. More particularly, disclosed herein is a praxinoscope kit and method and a praxinoscope formed therefrom wherein a plurality of panels can be assembled into a praxinoscope without a need for separate fasteners, glue, tape, or complex manufacturing methods.

BACKGROUND OF THE INVENTION

The praxinoscope, which was invented in 1877 by Charles-Emile Reynaud, is an animation device wherein a strip retaining a plurality of sequential animation images is retained facing inwardly in an annular configuration by a cylindrical outer wall. A plurality of mirrors, each typically flat, are disposed to form a generally annular, faceted inner wall spaced from the outer wall. The walls, mirrors, and images are placed so that the reflections of the animation images appear to be essentially stationary in position as the praxinoscope is rotated.

With this, a viewer observing the images through the mirrors perceives a rapid succession of images. These rapidly changing images give the illusion of motion, which derives from persistence of vision and what is referred to as the phi phenomenon. Under the phi phenomenon, human instinct tends to cause the observer to seek to create continuity between images that are viewed in quick progression. With persistence of vision, a flash of light presented by an image remains on the retina ephemerally.

A number of skilled inventors have developed variations and improvements on the original praxinoscope. However, to obtain effective animation, the praxinoscopes of the prior art have invariably required precise manufacturing processes and relatively expensive components, including particularly the mirrors that together form the faceted inner wall. The complicated equipment and meticulous assembly procedures necessary to proper performance have generally limited the applications of praxinoscopes to expensive educational devices and collectibles. Indeed, original praxinoscopes relied on individual glass mirror facets applied to wood forms. The resulting devices were invariably delicate and presented some risk of danger should a mirror become dislodged or broken. Furthermore, some elaborate devices provided individual adjustment screws for each facet. More recently, injection molded praxinoscopes have permitted certain levels of production, but they nonetheless require complex and expensive production methods and manufacturing equipment. With this, praxinoscopes have unfortunately remained generally inaccessible to the consuming public.

SUMMARY OF THE INVENTION

With a knowledge of the foregoing, the present inventor set about with the basic object of providing a kit for enabling the construction of an operational praxinoscope.

A related object of the invention is to provide a praxinoscope kit and method for forming a praxinoscope without a need for separate fasteners, glue, tape, or complex manufacturing methods.

An underlying object of the invention is to enable praxinoscopes to become readily accessible to provide educational and entertainment opportunities to greater numbers of persons through the use of relatively inexpensive components that can be assembled without specialized equipment or training.

These and further objects and advantages of embodiments of the invention will become obvious not only to one who reviews the present specification and drawings but also to those who have an opportunity to enjoy the use of an embodiment of the praxinoscope kit and method disclosed herein. However, it will be appreciated that, although the accomplishment of each of the foregoing objects in a single embodiment of the invention may be possible and indeed preferred, not all embodiments will seek or need to accomplish each and every potential object and advantage. Nonetheless, all such embodiments should be considered within the scope of the present invention.

In carrying forth these objects, a basic embodiment of the invention comprises a kit of parts for forming a praxinoscope. The kit of parts is formed by a base, an outer wall with an upper longitudinal edge and a lower longitudinal edge, and an inner wall with a mirrored surface, an upper longitudinal edge, a lower longitudinal edge, and means for forming a plurality of facets in the inner wall. Means are provided for securing the lower longitudinal edge of the outer wall to the base to retain it in a substantially cylindrical configuration with a given circumference, and means are provided for securing the lower longitudinal edge of the mirrored inner wall to the base to retain it in a faceted, substantially cylindrical configuration concentric with the outer wall but with a circumference less than the circumference of the outer wall. Under this basic kit, the base, the outer wall, and the inner wall can be secured together to form a praxinoscope, and perceived animation can be achieved by disposing a plurality of images facing inwardly on an inner surface of the outer wall and rotating the praxinoscope.

The kit can additionally include an upper panel and means for securing the upper longitudinal edge of the inner wall to the upper panel. Furthermore, an axle member can be concentrically received through the base and the upper panel for enabling a manual rotation of the resulting praxinoscope. Animation can thus be achieved by, for example, rotating the praxinoscope after placing an image strip with a plurality of sequential images disposed thereon within the outer wall with the images facing inwardly.

The base, the outer wall, and the inner wall can be initially disposed within a single panel of material for being removed and secured together to form the praxinoscope. In such embodiments, the outer wall can be formed from first and second elongate wall panels to permit sufficient length of the outer wall without a need for an exceptionally large panel of material. Means can also be provided securing the first and second wall panels in an end-to-end relationship.

The means for forming the plurality of facets in the inner wall can take any effective form, including a plurality of straight bending guides formed in the inner wall. The bending guides preferably communicate from the upper longitudinal edge to the lower longitudinal edge of the inner wall so that facets are formed between the bending guides when the inner wall is bent at the bending guides. The bending guides could, for example, be formed by creases, stamping, straight drawn lines, slit creasing where the substrate is cut partially through, scoring, perforations, or any other means or combination thereof.

In particular embodiments, the means for securing the lower longitudinal edge of the mirrored inner wall to the base can take the form of a plurality of teeth that project from the lower longitudinal edge of the inner wall in combination with a plurality of correspondingly spaced apertures disposed in a ring shape in the base for receiving the teeth. Likewise, the means for securing the lower longitudinal edge of the outer wall to the base can be a plurality of teeth that project from the lower longitudinal edge of the outer wall in combination with a plurality of correspondingly spaced apertures disposed in a ring shape in the base outwardly spaced form the ring shape of the apertures for receiving the teeth that project from the lower longitudinal edge of the inner wall. With this, the inner and outer walls can be retained relative to the base in a spaced, concentric relationship. Still further, an upper panel can be secured to the upper longitudinal edge of the inner wall by a plurality of teeth that project from the upper longitudinal edge of the inner wall in combination with a plurality of correspondingly spaced apertures disposed in a ring shape in the upper panel for receiving those teeth. The teeth can have proximal ends, tips, and body portions that taper from the proximal ends to the tips. Notches at the proximal ends of the teeth can produce a positive mechanical engagement between the teeth and the corresponding apertures.

In certain constructions of the invention, the plurality of teeth can be substantially centered around the bending guides between the facets in the inner wall so that the teeth assume a chevron cross section when the inner wall is formed into a ring shape with the facets formed therein. The apertures in the base can then have at least end portions angled to form at least a portion of a chevron configuration so that the location and proper orientation of the facets can be ensured.

In an alternative embodiment, the teeth can be disposed between the bending guides in the inner wall, and the apertures in the base for receiving the teeth can have at least end portions disposed along the circumference of the ring. For example, the apertures can be diamond shaped with opposed points disposed along the circumference of the ring. This again can ensure that the facets are retained in predetermined orientations.

A praxinoscope can be formed from the kit of parts by forming a plurality of facets in the inner wall, securing the lower longitudinal edge of the inner wall to the base to retain the inner wall in a faceted, substantially cylindrical configuration with a given circumference, and securing the lower longitudinal edge of the outer wall to the base to retain the outer wall in a substantially cylindrical configuration concentric with the inner wall with a circumference greater than the circumference of the inner wall. The perception of animation can then be achieved by disposing a plurality of images facing inwardly on an inner surface of the outer wall and rotating the praxinoscope, such as by use of the axle member.

An alternative kit of parts for forming a praxinoscope comprises a base, a hub with a mirrored surface and means for forming a plurality of facets in the hub with narrowed bottom portions, widened top portions, and wedge-shaped body portions therebetween, and means for securing the bottom portions of the facets of the hub to the base to retain the hub in a faceted, conical configuration with the facets angled toward the base. Under this construction, when the base and the hub are secured together to form a praxinoscope, perceived animation can be achieved by disposing a plurality of images on the base concentric with the hub and a rotation of the praxinoscope.

The hub can be formed from a single panel of material. The means for forming a plurality of facets in the hub can comprise bending guides for guiding in a folding of the panel of material to form the facets. The means for securing the bottom portions of the facets of the hub to the base could comprise a plurality of teeth that project from the bottom portions of the facets in combination with a plurality of correspondingly spaced apertures disposed in a ring shape in the base for receiving the teeth. A cap member can top the hub, and an axle member can be concentrically received through the base to permit a rotation of the praxinoscope.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

In the accompanying drawings:

FIG. 3 is a lower perspective view of the praxinoscope of FIG. 1;

FIG. 4 is a top plan view of a kit for forming a praxinoscope as disclosed herein;

FIG. 11 is a top plan view of a panel of material including further alternative panel components for forming a praxinoscope under the invention.

DETAILED DESCRIPTION OF PREFERRED EMBODIMENTS

The present invention for a method and kit for assembling a praxinoscope disclosed herein is subject to widely varied embodiments. However, to ensure that one skilled in the art will be able to understand and, in appropriate cases, practice the present invention, certain preferred embodiments of the broader invention revealed herein are described below and shown in the accompanying drawing figures.

Figure 1:
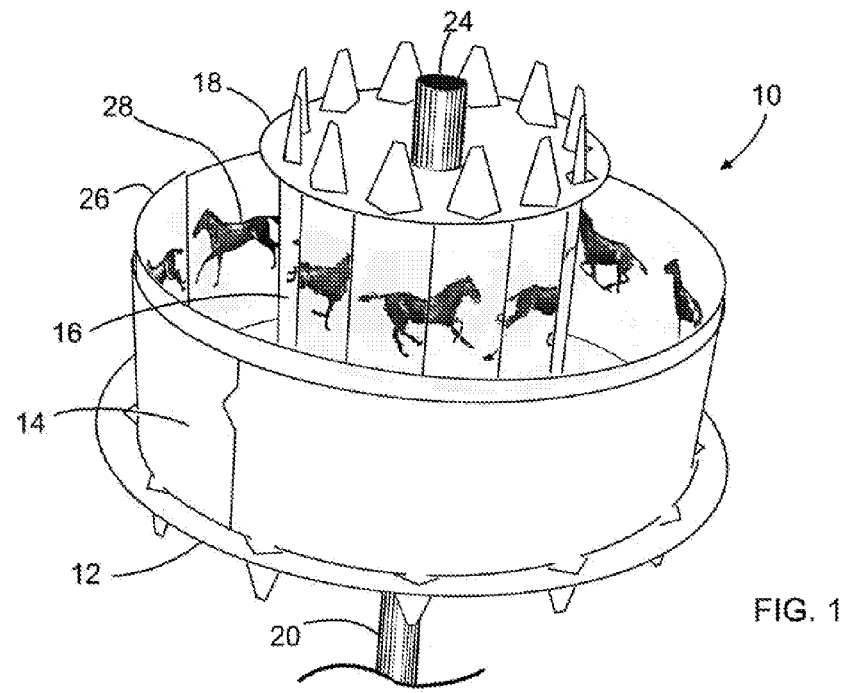
FIG. 1 is a perspective view of a praxinoscope pursuant to the invention.
Figure 2:
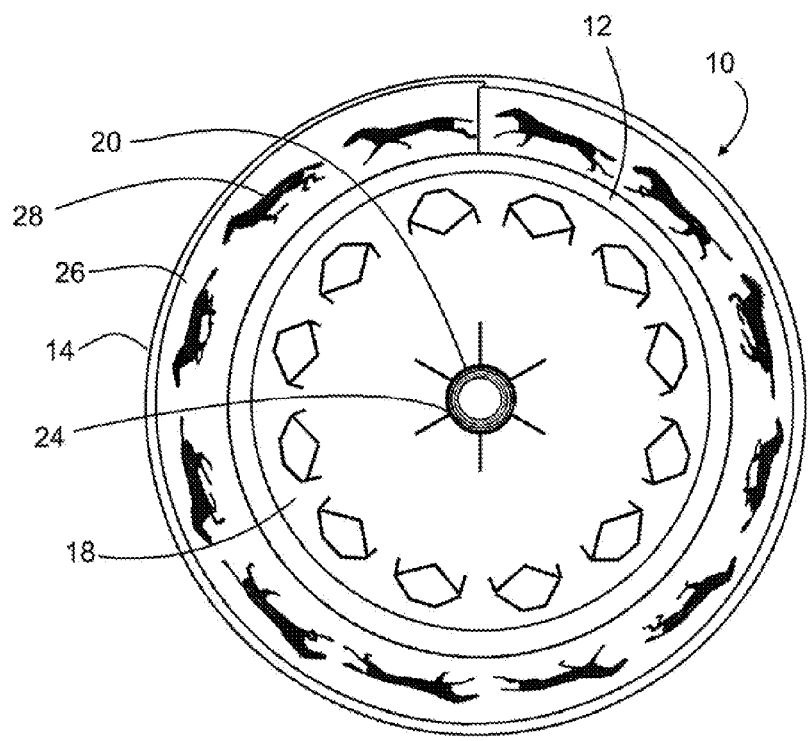
FIG. 2 is a top plan view of the praxinoscope of FIG. 1.

A praxinoscope formed from a kit and method according to the present invention is indicated generally at 10 in FIGS. 1 through 3. The praxinoscope 10 has a base panel 12 that retains a cylindrical outer wall 14 and a faceted and mirrored inner wall 16. An upper panel 18 is disposed atop the inner wall 16. An axle member 20 is concentrically received through an aperture 22 in the base panel 12 and through an aperture 24 in the upper panel 18.

With the praxinoscope 10 so constructed, an image strip 26 with a plurality of sequential images 28 disposed thereon can be disposed within the outer wall 14 to form a ring with the images 28 facing inwardly. The praxinoscope 10 can then be rotated by use of the axle member 20 with the axle member 20 employed as a handle. Animation is thus achieved as the observer views progressive images 28 on the image strip 26 as they are reflected against the mirrored inner wall 16.

As disclosed herein, the praxinoscope 10 can be formed from a kit 30, such as that shown in FIG. 4. There, the components of the praxinoscope 10 are shown as separate parts formed within a single panel 32 of material, which is again shown in FIG. 5. The kit 30 includes the base panel 12, first and second cylindrical outer wall panels 14A and 14B that can together form the outer wall 14, the mirrored inner wall panel 16, the upper panel 18, and the axle member 20. A plurality of image strips 26, each with a plurality of sequential images 28 disposed thereon, can additionally be included with the kit 30.

In the depicted embodiment, the base panel 12, the first and second cylindrical outer wall panels 14A and 14B, the mirrored inner wall panel 16, and the upper panel 18 are initially formed, such as by laser cutting, perforating, or any other effective method, within the single panel 32 of material. In one presently contemplated embodiment of the invention, the panel 32 comprises a panel of mirrored paper card stock. It is to be noted, however, that only the inner wall panel 16 needs to be mirrored for the assembled praxinoscope 10 to provide animation. Moreover, numerous other materials could be employed, including standard paper sheets or any other suitable material.

The inner wall panel 16 is has evenly spaced, straight bending guides formed therein. The bending guides could be formed by any effective method, including perforating, scoring, slit creasing where the substrate is sliced partially therethrough, stamping, guide lines, or any other method that might occur to one skilled in the art after reading this disclosure. It has been found that slit creasing can be advantageous in that the straight cutting and effective localized thinning of the substrate produces exceedingly accurate bending guides and resultant bends and folds that are straight, consistent, and accurate. Where perforations are employed, it is presently preferred that the perforations have perforations substantially equal to the intervening solid portions. In any case, the bending guides to permit a bending or folding of the inner wall panel 16 along straight lines to form individual mirrored facets of substantially identical widths that establish the inner wall 16 of the assembled praxinoscope 10.

It has been found that pre-creasing the inner wall panel 16 or otherwise forming bending guides thereon is very helpful to achieving the optical clarity necessary to effective animation. With the bending guides, the individual facets can be more easily rendered substantially flat and consistent. Distorted or bent mirrored facets would impair the animation effect not only for the clarity of the reflection provided by the individual facet but also since each reflected image must look as clear and consistent as its predecessor so the brain can easily convince itself that the same subject is moving. Under the present design, slit creases in the mirrored paper of the inner wall panel 16 and the angled relationships between the several facets additionally force each abutting facet to become rigid, thus compelling the mirrored facets to achieve flat and non-distorted configurations. Still further, by bending a continuous panel 16 into the several equally sized facets, the facets have little or no perceivable gap between them so that perceived animation is as continuous and convincing as possible. This represents an improvement over prior art systems employing separate mirrors retained in place with substantial gaps therebetween.

Figure 5:
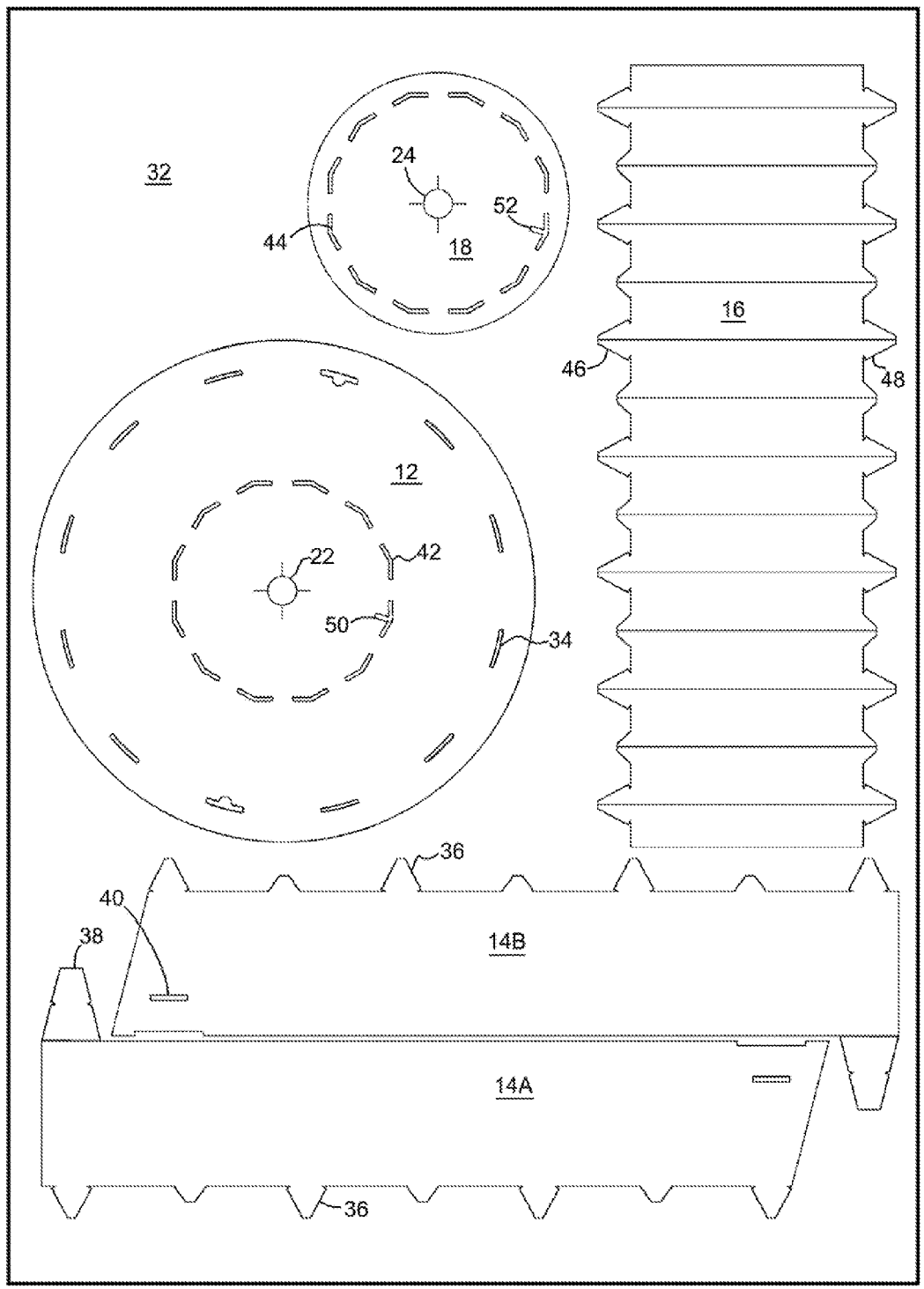
FIG. 5 is a top plan view of a panel of material including panel components for forming a praxinoscope under the invention.

As seen in FIG. 5, for example, the base panel 12 has an outer ring of apertures 34 adjacent to the outer edge thereof. The apertures 34 can, for example, each be generally straight or they can have a curve as shown. The curve matches the curve of the outer ring along which the apertures 34 are disposed. The first and second outer wall panels 14A and 14B have teeth 36 correspondingly spaced relative to the apertures 34. The teeth 36 narrow toward their tips to have wedge-shaped body portions, and the teeth 36 have notches at the widened bases thereof. The teeth 36 project from what can be considered the lower edge of the panels 14A and 14B for being received into the apertures 34 in the base panel 12. The teeth 36 can have alternating greater and lesser heights as shown. This has been found to aid in the assembly of the praxinoscope 10 in that a succeeding tooth 36 is less likely to prevent the insertion of a preceding tooth 36 into a given aperture 34.

As noted above, the outer wall 14 is formed by first and second panels 14A and 14B. Of course, it would be possible to have a single panel of material forming the entire outer wall 14, but separating the outer wall 14 into first and second panels 14A and 14B is advantageous in that the entire outer wall 14 can be crafted while using a single sheet of stock. Where the first and second panels 14A and 14B are employed, a first end of each can be mitered. That mitered end has been found to prevent undesirable catching of image strips 26 when they must be angularly adjusted relative to the outer wall 14 for better alignment. Each panel 14A and 14B can have an extended tab 38 that projects from the upper edge thereof adjacent to the second end for overlying the first end of the other panel 14A or 14B and engaging an aperture 40 disposed adjacent to the first end of each panel 14A and 14B.

Similarly, an inner ring of apertures 42 is disposed in the base panel 12 spaced from the outer ring of apertures 34. To ensure that the animated images 28 appear to be disposed in a consistent position centered in the praxinoscope, the inner ring of apertures 42 has a diameter approximately one-half that of the outer ring of apertures 34. Still further, the upper panel 18 has a ring of apertures 44 matching the inner ring of apertures 42 in the base panel 12 in size, shape, and diameter. The rings of apertures 34, 42, and 44 are concentric relative to the apertures 22 and 24 in the lower and upper panels 12 and 18 through which the axle member 20 is received.

The mirrored inner wall panel 16 has a plurality of evenly spaced teeth 46 that project from along what may be considered the upper edge thereof for being received into the apertures 44 in the upper panel and a plurality of evenly spaced teeth 48 that project from along the lower edge thereof for being received into the inner ring of apertures 42 in the base panel 12. The teeth 46 and 48 narrow toward their tips to have wedge-shaped body portions, and the teeth 46 and 48 have notches at the widened bases thereof. Again, to ease assembly, the teeth 46 and 48 can alternate between longer and shorter heights.

The teeth 46 and 48 are centered around the folds formed along the bending guides between the facets in the wall panel 16 so that the teeth 46 and 48 assume a chevron cross section when the wall panel 16 is formed into a ring. To ensure optimal alignment and secure retention of the wall panel 16, the individual apertures 42 and 44 are also chevron shaped. Since the angle of each mirrored facet of the wall panel 16 is critical to effective animation, it will be appreciated that the chevron shaped apertures 42 and 44 ensure proper angular orientation of all facets.

Additionally, one aperture 42 and 44 in each of the rings of apertures 42 and 44 has an inwardly communicating radial slot 50 and 52. With this, the end portions of the inner wall panel 16 can be turned inwardly to achieve a facing relationship and to cause the teeth 46 and 48 at the upper and lower edges thereof to assume a T-shaped cross-sectional configuration and to permit the respective teeth 46 and 48 to be received partly into the apertures 46 and 48 and partly into the slots 50 and 52.

Figure 6:
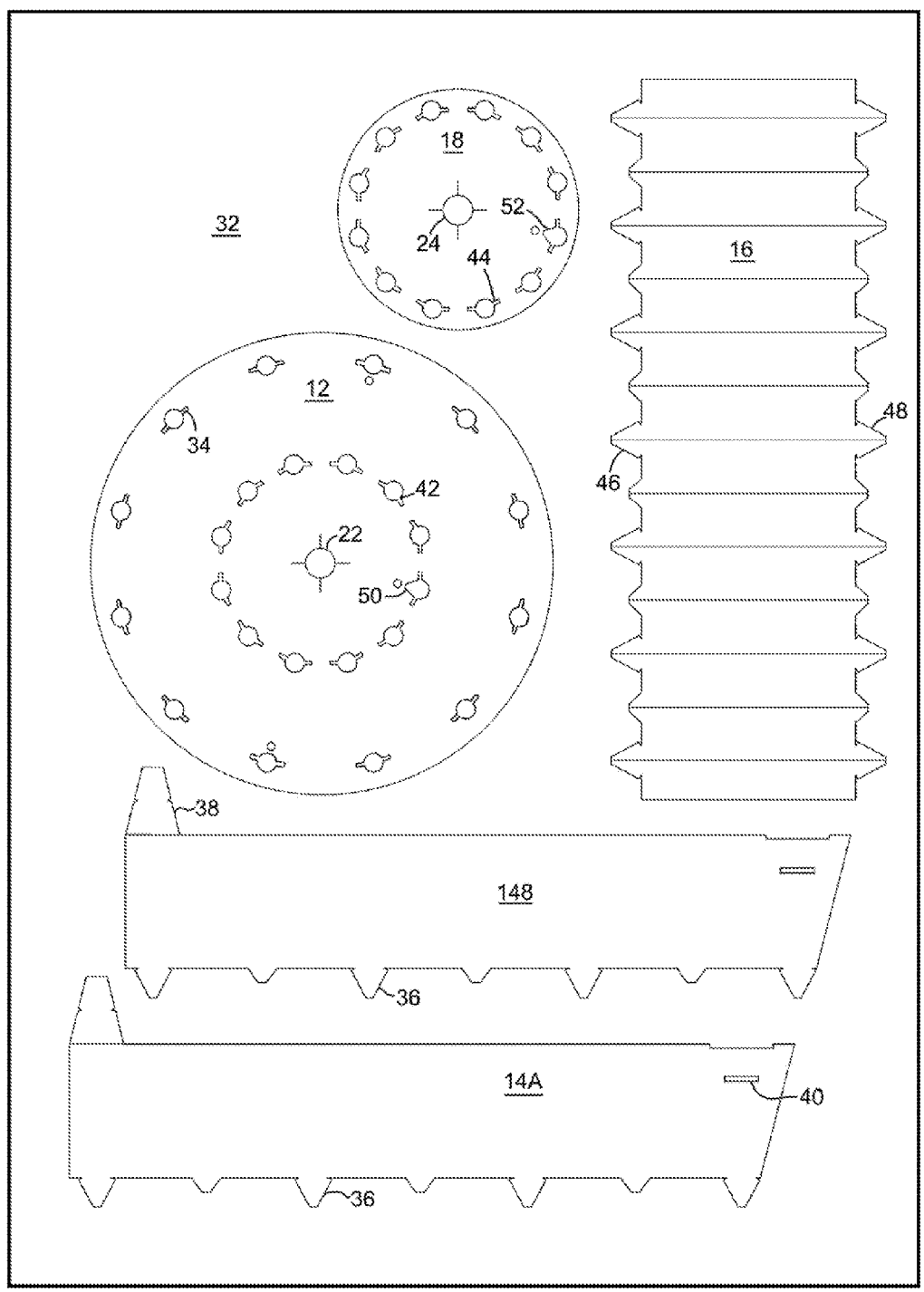
FIG. 6 is a top plan view of a panel of material including alternative panel components for forming a praxinoscope under the invention.

Looking to FIG. 6, an alternative embodiment of the panel 32 forming part of a kit 30 according to the invention is shown. There, each of the apertures 34, 42, and 44 have narrow first and second end portions as in the embodiment of FIG. 4, and the end portions of the apertures 42 and 44 are angled in relation to one another as before for receiving the chevron-shaped teeth 46 and 48. However, the central portions of the apertures 34, 42, and 44 are opened, such as in an oval or circular shape. It has been found that the open central portions with narrow first and second end portions permit easier assembly of the praxinoscope 10 while ensuring accurate registration and alignment of the constituent components. Additionally, when all panel components are fit onto a single panel 32 of material as in FIGS. 4, 5, and 6, it is possible for a user simply to print the parts from a standard printer onto standard 8½×11 inch stock. The components on the panel 32 could be separated by any effective method, such as by use of scissors, a razor, or otherwise. Practices of the invention are possible wherein designs are downloaded from the internet or otherwise transmitted electronically.

With a kit 30 as disclosed herein, one can assemble a praxinoscope 10 that demonstrates vivid animation simply from a plurality of card stock or other panels with no need for specialized training or for fasteners, tape, glue, or complex machinery. First, one can separate the base panel 12, the first and second cylindrical outer wall panels 14A and 14B, the mirrored inner wall panel 16, and the upper panel 18 from the remainder of the panel 32 of material. Then, one can pre-poke the axle member 22 through the aperture 22 in the base panel 12 and through the aperture 24 in the upper panel 18 to facilitate easier re-insertion in a later step. The mirrored inner wall panel 16, which is pre-creased, such as by embossing, to have fourteen mirrored facets, can then be folded into a curved configuration. This can preferably be done by disposing the wall panel 16 face down on a support surface and then, with a slight rolling motion, folding each section of the panel 16 along the pre-creased lines.

With the wall panel 16 folded as described, the first and second ends of the inner wall panel 16 can be disposed in a facing relationship to cause the wall panel 16 to achieve an annular, faceted configuration. The teeth 46 of the end portions, which are together disposed in a generally T-shaped configuration, can then be aligned with and inserted into the aperture 44 in the upper panel 18 with the inwardly communicating slot 52. Then, one can progressively insert the remaining teeth 46 into the remaining apertures 44 until all teeth 46 are partway received into all apertures 44. With all teeth 46 partly received into the apertures 44, the teeth 46 can be fully inserted through the apertures 44, preferably by pulling on the teeth 46 instead of pushing them through, which can produce inadvertent folding and bowing. The notches at the base of the teeth 46 will then engage the upper panel 18 to retain the assembled configuration.

The assembled upper panel 18 and wall panel 16 can then be turned over. The teeth 48 projecting from the lower edge of the wall panel 16 can then be engaged with the apertures 42 in the base panel 12 as described relative to the apertures 44 in the upper panel 18. The T-shape formed by the teeth 48 of the end portions of the wall panel 16 can thus be inserted into the aperture 42 having the radial slot 50, and the remaining teeth 48 can be inserted into the remaining apertures 42 as described. The notches at the base of the teeth 48 will then engage the base panel 12 to retain the assembled configuration. The T-shape formed by the teeth 48 and the end walls of the wall panel 16 additionally operates to provide structural rigidity and to ensure that the facets remain properly oriented.

The outer wall 14 can then be installed by slightly overlapping the first end of the first panel 14A with the second end of the second panel 14B and slightly overlapping the second end of the first panel 14A with the first end of the second panel 14B. The tabs 38 can then be folded over and inserted into the respective apertures 40 to secure the panels 14A and 14B together. Then, the teeth 36 can be aligned with and inserted into the outer ring of apertures 34 in the base panel 12 using the steps described above. It will be noted that two teeth 36 overlap where the panels 14A and 14B overlap. To accommodate that overlap, two corresponding apertures 34 can be broadened otherwise configured to receive the double teeth 36.

The axle member 20, which can be tubular, can then be inserted through the aperture 22 in the base panel 12 and then through the aperture 24 in the upper panel 18 until the axle member 20 projects slightly through the aperture 24. The remainder of the axle member 20 then remains projecting below the base panel 12 thereby to form a handle for operating the praxinoscope 10. Although not necessary to the assembly and operation of the praxinoscope 10, one could secure one or more of the components of the praxinoscope 10 together, such as by applying glue to the apertures 22 and 24 where the axle member 20 is received, and to other connections as desired.

Then, one can choose an animation strip 26 to be inserted into the cylindrical outer wall 14. The ends of the strip 26 can be brought together to form a ring, and the strip 26 can be inserted to ring the inner face of the outer wall 14 with the images 28 facing inwardly toward the mirrored inner wall 16. The ends of the strip 26 can be adjusted as necessary, ideally to meet one another, and the strip 26 can be turned relative to the praxinoscope 10 to induce proper alignment of the images 28 with the facets of the inner wall 16. The axle member 20 can then be rotated, such as by being placed between the palms of a user's hands and then turned by rubbing the user's hands in opposite directions. The praxinoscope 10 will then spin, and animation of the images 28 will be achieved as the observer perceives progressive images 28 reflected by the inner wall 16.

The kit for forming the praxinoscope 10 could alternatively be formed as in FIG. 11 where the components, except for the axle member 20, are again formed within a single panel 32 of material. More particularly, the panel 32 includes the base panel 12, the first and second outer wall panels 14A and 14B, the mirrored inner wall panel 16, and the upper panel 18. As before, the components could be prepared for separation from the main body of the panel 32 by any effective method, including laser cutting, perforating, cutting with scissors or a knife blade, or any other effective method. At least one face of the inner wall panel 16 and potentially an entire surface of the panel 32 will be mirrored.

The base panel 12 in FIG. 11 has an outer ring of apertures 34 adjacent to the outer edge thereof. In this embodiment, the apertures 34 are diamond shaped with first and second opposed points of the diamonds disposed along a given circumference of the outer ring. The first and second outer wall panels 14A and 14B again have teeth 36 correspondingly spaced relative to the apertures 34. The teeth 36 narrow toward their tips to have wedge-shaped body portions, and the teeth 36 have notches at the widened bases thereof. The teeth 36 project from what can be considered the lower edge of the wall panels 14A and 14B for being received into the apertures 34 in the base panel 12 with the sides of the teeth 36 engaging the opposed points of the diamond-shaped apertures 34. The diamond-shaped apertures 34 enable insertion of the teeth 36 in a most efficient manner while the opposed points of the apertures 34 ensure proper orientation of the teeth 36 and thus the corresponding portions of the walls 14A and 14B.

Each of the first and second panels 14A and 14B in this embodiment has a pointed longitudinal tab 38 that projects from a first end thereof and a diamond-shaped aperture 40 adjacent to the second end thereof. The tabs 38 can have notches at the bases thereof for positively engaging the apertures 40 so that the wall panels 14A and 14B can be united to form the outer wall 14.

An inner ring of apertures 42 is disposed in the base panel 12 spaced from the outer ring of apertures 34. To ensure that the animated images 28 appear to be disposed in a consistent position, the inner ring of apertures 42 has a diameter approximately one-half that of the outer ring of apertures 34. Additionally, the upper panel 18 has a ring of apertures 44 matching the inner ring of apertures 42 in the base panel 12 in size, shape, and in the diameter of the circle along which they are disposed. The rings of apertures 34, 42, and 44 are concentric relative to the apertures 22 and 24 in the lower and upper panels 12 and 18 through which the axle member 20 is received. Like the apertures 34, the apertures 42 and 44 are diamond shaped with first and second opposed points of the diamonds disposed along a given circumference of the respective ring.

The mirrored inner wall panel 16 has a plurality of evenly spaced teeth 46 that project from along what may be considered the upper edge thereof for being received into the apertures 44 in the upper panel and a plurality of evenly spaced teeth 48 that project from along the lower edge thereof for being received into the inner ring of apertures 42 in the base panel 12. The teeth 46 and 48 narrow toward their tips to have wedge-shaped body portions, and the teeth 46 and 48 have notches at the widened bases thereof for positively engaging the apertures 42 and 44.

In this embodiment, however, the teeth 46 and 48 are centered on the facets in the wall panel 16 and between the bending guides that connect the facets in the wall panel 16. Under this construction, the teeth 46 and 48 can engage the opposed points of the diamond-shaped apertures 42 and 44. With this, the teeth 46 and 48 and the facets to which they are connected are automatically oriented in a consistent and symmetrical manner in a proper angular orientation.

The wall panel 16 has a pointed tab 84 that projects longitudinally from the first end thereof. Opposed notches are disposed at the base of the tab 84 for positively engaging an aperture 86 formed at the base of a flap 88 at the second end of the wall panel 16. With that, the wall panel 16 can be retained in a ring configuration for engagement of the teeth 46 and 48 with the apertures 42 and 44.

Figure 7:
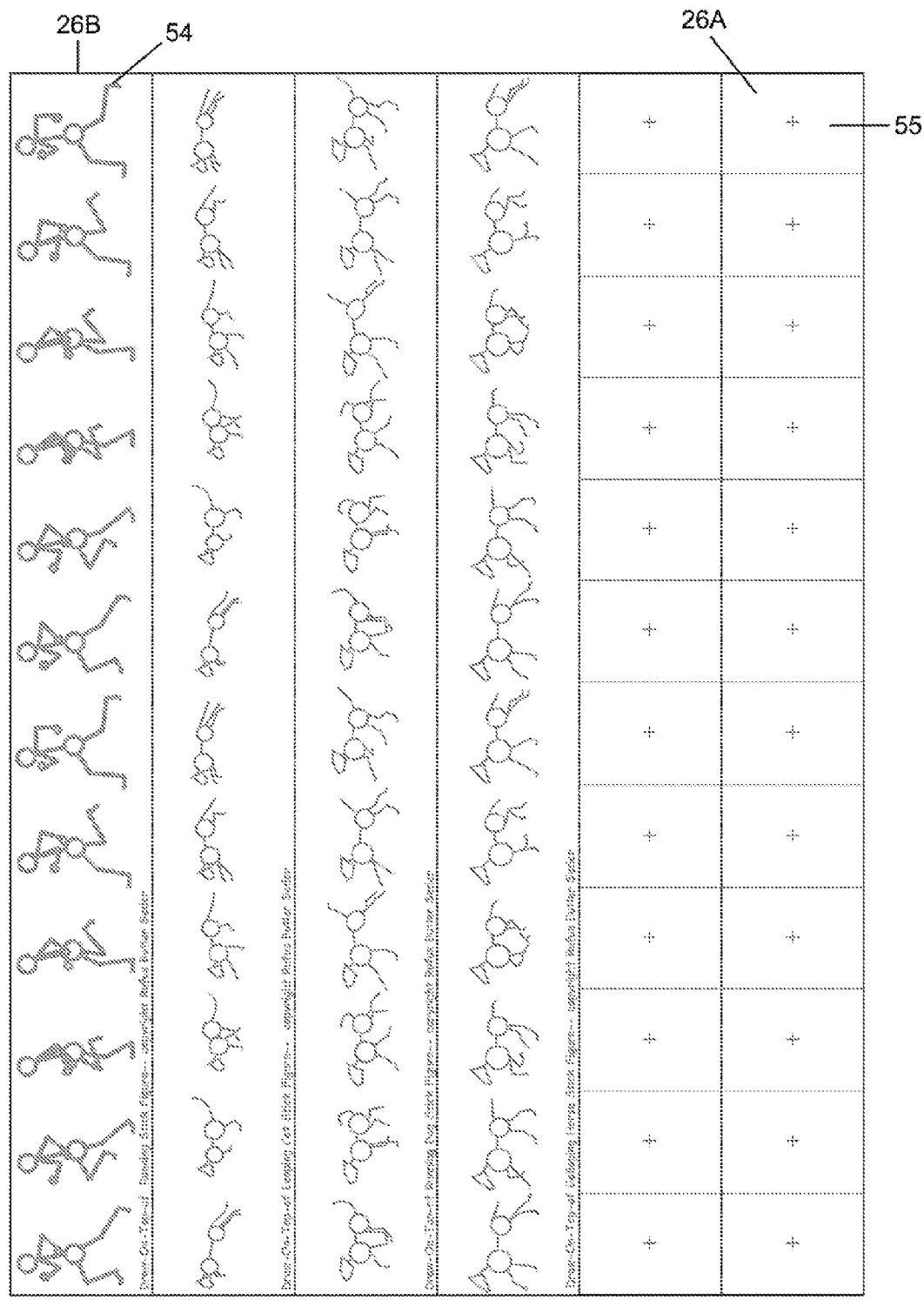
FIG. 7 is a top plan view of alternative animation strips according to the invention.

Animation strips 26 can be changed as desired to achieve different animations. Moreover, as suggested by FIG. 7, it is possible to have blank animation strips 26A, potentially with boxes 55 or other means for providing a predetermined drawing area. It is additionally or alternatively possible to have outlined animation strips or animation strips 26B with stick figures 54 to be colored or otherwise completed by the user to achieve unique, personalized animations.

Of course, numerous variations of the praxinoscope 10 are contemplated and within the scope of the invention. By way of example, the depicted embodiment can be operated using a simple drinking straw as the axle member 20. However, it will be appreciated that other means for rotating the praxinoscope 10 could readily be employed, such as by mounting on a pivot or central bearing, a turntable or other rotational mechanism, by being spun like a top, or even by being suspended by a strand of material for free rotation.

Additionally, the components of the praxinoscope 10 are shown as being cut from a single panel 32 of material. However, it would be possible to have multiple identical components formed on dedicated panels of material or for the components to be otherwise formed. For example, it would be possible for the components of the praxinoscope 10 to be removable from some other pre-existing structure. Indeed, it would be possible for the components of the praxinoscope 10 to be able to be cut, torn, or otherwise removed from a box, such as a value meal box commonly distributed by fast food chains.

Figure 8:
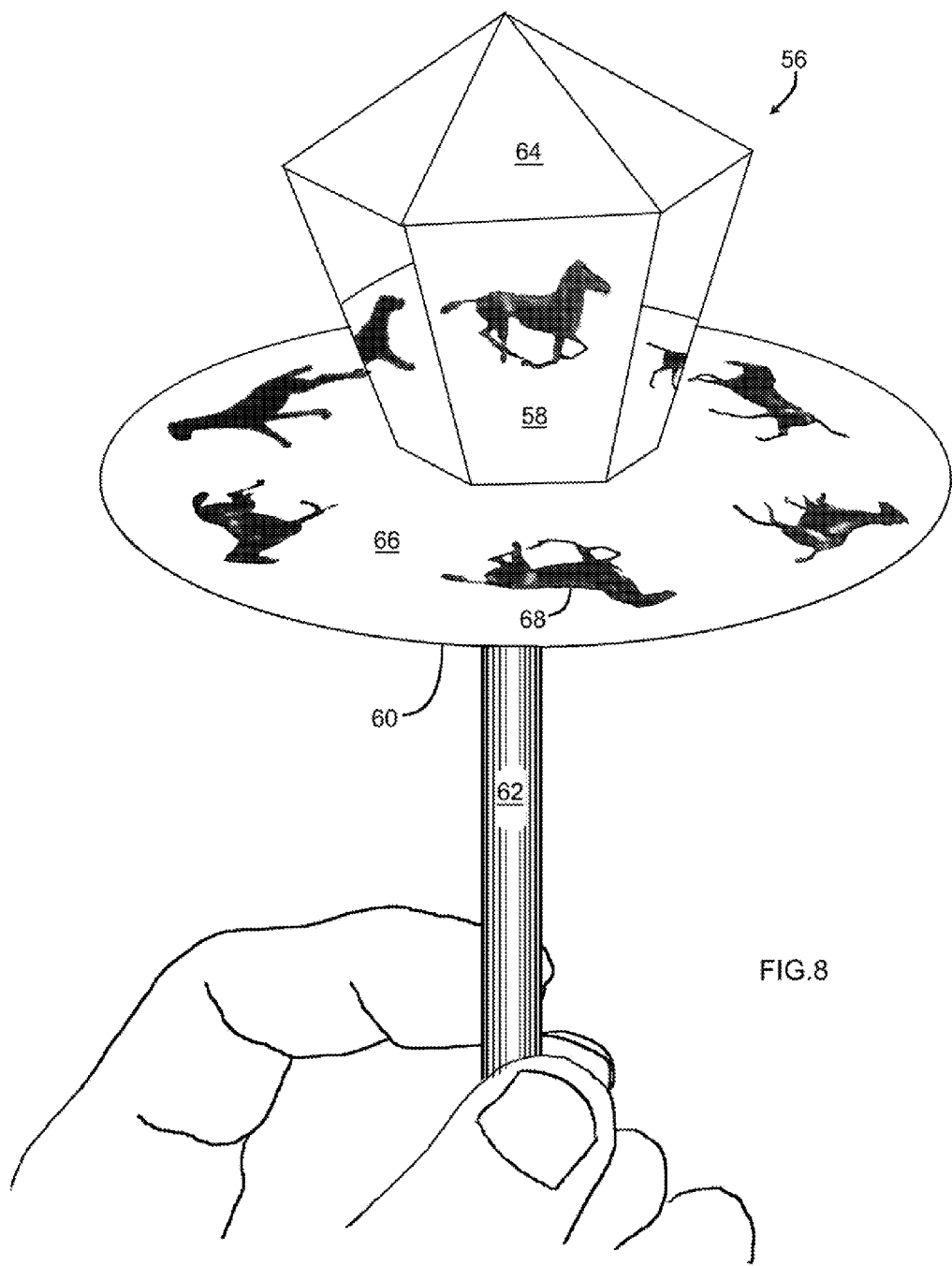
FIG. 8 is a perspective view of an alternative praxinoscope as taught herein.
Figure 9:
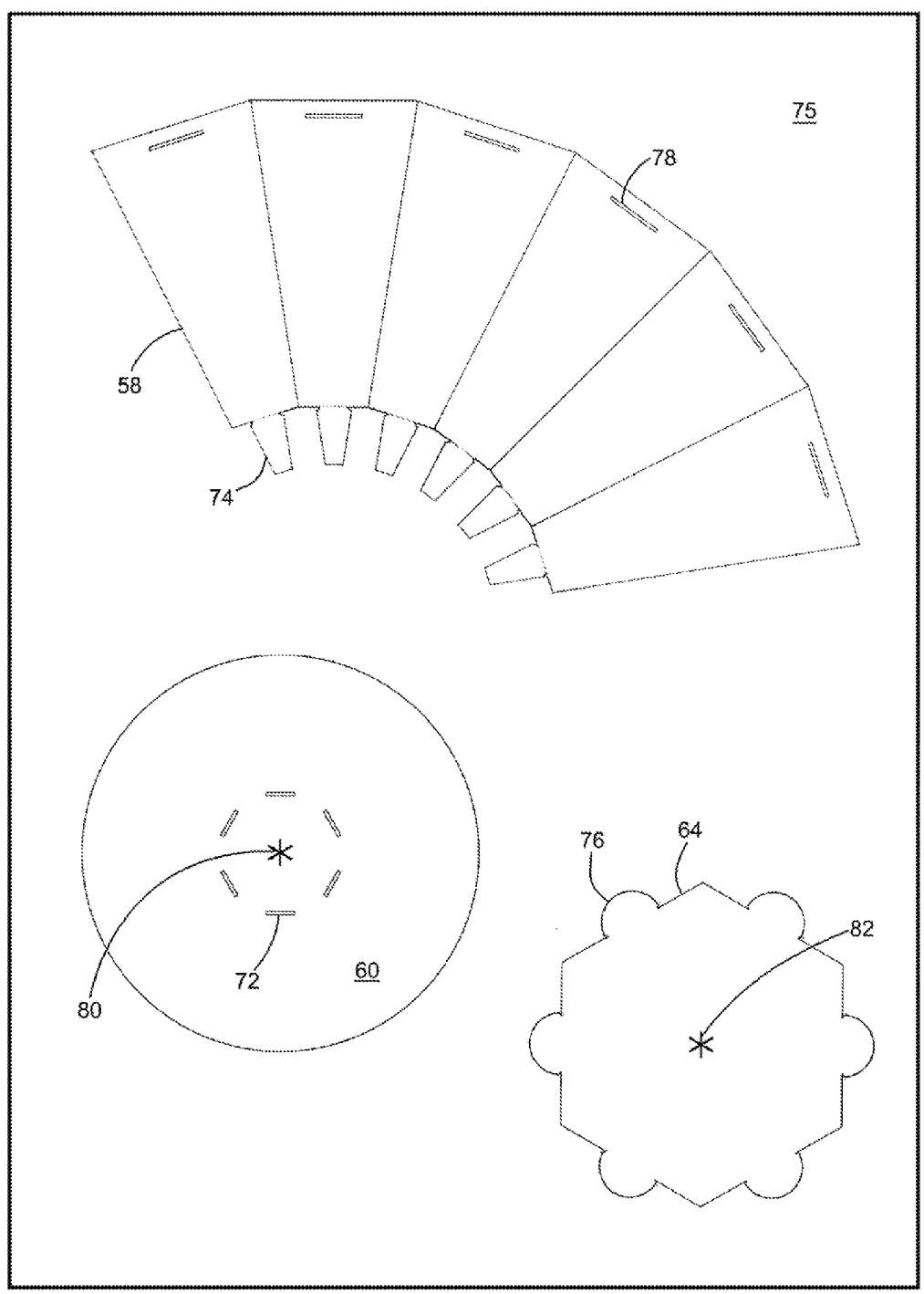
FIG. 9 is a top plan view of a panel of material including panel components for forming the praxinoscope of FIG. 8.
Figure 10:
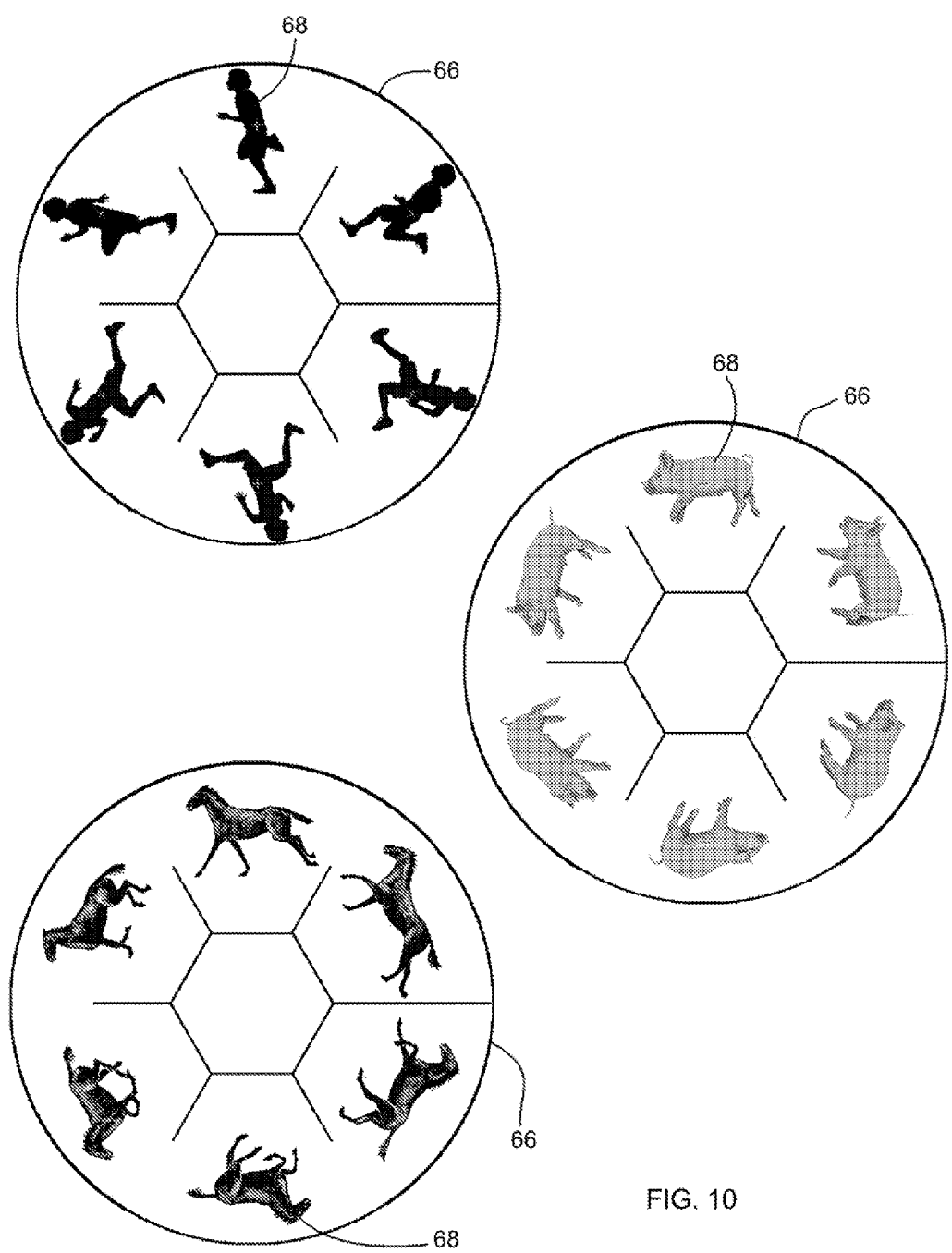
FIG. 10 is a top plan view of alternative animation panels for the praxinoscope of FIG. 8.

An alternative embodiment of the praxinoscope disclosed herein is indicated generally at 56 in FIG. 8, and components of that praxinoscope 56 are shown in FIGS. 9 and 10. There, the praxinoscope 56 has a faceted central hub 58 formed from a single panel of material, which can be pre-creased, lined, or otherwise formed with bending guides to act as means for forming multiple, distinct facets, in this example six. The hub 58 has a plurality of teeth 74 that project from what can be considered the bottom thereof for being received into apertures 72 that are disposed in an annular configuration in a base plate 60. The facets of the hub 58 are tapered so that, when the panel forming the hub 58 is folded, the facets will be angled toward the base plate 60. A cap member 64 is retained atop the hub 58, such as by engagement of tabs 76 on the cap member 64 with apertures 78 in the hub 58. These panel components of the praxinoscope 56 can be printed, laser cut, embossed, or otherwise formed on a single panel 75 of material.

When the praxinoscope 56 is assembled, an axle member 62, which could comprise a straw, a pencil, a dowel, or any other member, can be inserted through an aperture 80 in the base plate 60 and possibly through an aperture 82 in the cap member 64. An animation disk 66 with a plurality of sequential images 68 applied thereto can be disposed atop the base plate 60. Under this arrangement, the axle member 62 can be employed to rotate the praxinoscope 56 to produce animation of the images 68 on the animation disk 66.

With certain details and embodiments of the present invention for a method and kit for assembling a praxinoscope disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. A kit of parts for forming a praxinoscope, the kit of parts comprising:
   a base;
   an outer wall with an upper longitudinal edge and a lower longitudinal edge;

means for securing the lower longitudinal edge of the outer wall to the base to retain the outer wall in a substantially cylindrical configuration with a given circumference;

an inner wall with a mirrored surface, an upper longitudinal edge, a lower longitudinal edge, and means for forming a plurality of facets in the inner wall; and means for securing the lower longitudinal edge of the mirrored inner wall to the base to retain the inner wall in a faceted, substantially cylindrical configuration concentric with the outer wall and with a circumference less than the circumference of the outer wall;

whereby, when the base, the outer wall, and the inner wall are secured together to form a praxinoscope, perceived animation can be achieved by disposing a plurality of images facing inwardly on an inner surface of the outer wall and a rotation of the praxinoscope.

2. The kit of parts of claim 1 further comprising an upper panel and means for securing the upper longitudinal edge of the inner wall to the upper panel.

3. The kit of parts of claim 2 further comprising an axle member for being concentrically disposed through the base and the upper panel for rotating the praxinoscope.

4. The kit of parts of claim 1 further comprising an image strip with a plurality of sequential images disposed thereon for being disposed within the outer wall.

5. The kit of parts of claim 1 wherein the base, the outer wall, and the inner wall are initially disposed within a single panel of material for being removed and secured together to form the praxinoscope.

6. The kit of parts of claim 5 wherein the outer wall is formed from first and second elongate wall panels and further comprising means for securing the first and second wall panels in an end-to-end relationship.

7. The kit of parts of claim 1 wherein the means for forming the plurality of facets in the inner wall comprises a plurality of straight bending guides formed in the inner wall wherein the bending guides communicate from the upper longitudinal edge to the lower longitudinal edge of the inner wall so that facets are formed between the bending guides when the inner wall is bent at the bending guides.

8. The kit of parts of claim 7 wherein the straight bending guides comprise creases formed in the inner wall.

9. The kit of parts of claim 1 wherein the means for securing the lower longitudinal edge of the mirrored inner wall to the base comprises a plurality of teeth that project from the lower longitudinal edge of the inner wall in combination with a plurality of correspondingly spaced apertures disposed in a ring shape in the base for receiving the teeth that project from the lower longitudinal edge of the inner wall.

10. The kit of parts of claim 9 wherein the means for securing the lower longitudinal edge of the outer wall to the base comprises a plurality of teeth that project from the lower longitudinal edge of the outer wall in combination with a plurality of correspondingly spaced apertures disposed in a ring shape in the base outwardly spaced form the ring shape of the apertures for receiving the teeth that project from the lower longitudinal edge of the inner wall.

11. The kit of parts of claim 9 wherein the teeth that project from the lower longitudinal edge of the inner wall have proximal ends, tips, and body portions that taper from the proximal ends to the tips and further comprising notches at the proximal ends of the teeth for engaging the apertures in the base.

12. The kit of parts of claim 9 further comprising an upper panel and means for securing the upper longitudinal edge of the inner wall to the upper panel comprising a plurality of teeth that project from the upper longitudinal edge of the inner wall in combination with a plurality of correspondingly spaced apertures disposed in a ring shape in the upper panel for receiving the teeth that project from the upper longitudinal edge of the inner wall.

13. The kit of parts of claim 9 wherein the means for forming the plurality of facets in the inner wall comprises a plurality of straight bending guides formed in the inner wall wherein the bending guides communicate from the upper longitudinal edge to the lower longitudinal edge of the inner wall so that facets are formed between the bending guides when the inner wall is bent at the bending guides and wherein the plurality of teeth are substantially centered around the bending guides between the facets in the inner wall so that the teeth assume a chevron cross section when the inner wall is formed into a ring shape with the facets formed therein.

14. The kit of parts of claim 13 wherein the apertures in the base disposed in a ring for receiving the teeth that project from the lower longitudinal edge of the inner wall have at least end portions angled to form at least a portion of a chevron configuration.

15. The kit of parts of claim 9 wherein the means for forming the plurality of facets in the inner wall comprises a plurality of straight bending guides formed in the inner wall wherein the bending guides communicate from the upper longitudinal edge to the lower longitudinal edge of the inner wall so that facets are formed between the bending guides when the inner wall is bent at the bending guides and wherein the plurality of teeth are disposed between the bending guides in the inner wall and wherein the apertures in the base disposed in a ring for receiving the teeth that project from the lower longitudinal edge of the inner wall have at least end portions disposed along the circumference of the ring whereby the facets are retained in predetermined orientations.

16. The kit of parts of claim 15 wherein the apertures in the base disposed in a ring for receiving the teeth that project from the lower longitudinal edge of the inner wall are diamond shaped with opposed points disposed along the circumference of the ring.

17. A method for forming a praxinoscope from the kit of parts of claim 1, the method comprising the following steps:
providing the kit of parts of claim 1;
forming a plurality of facets in the inner wall;
securing the lower longitudinal edge of the inner wall to the base to retain the inner wall in a faceted, substantially cylindrical configuration with a given circumference; and
securing the lower longitudinal edge of the outer wall to the base to retain the outer wall in a substantially cylindrical configuration concentric with the inner wall with a circumference greater than the circumference of the inner wall.

18. The method of claim 17 further comprising the step of producing the perception of animation by disposing a plurality of images facing inwardly on an inner surface of the outer wall and rotating the praxinoscope.

19. The method of claim 17 wherein the kit of parts further comprises an upper panel and means for securing the upper longitudinal edge of the inner wall to the upper panel and further comprising the step of securing the upper longitudinal edge of the inner wall to the upper panel.

20. The method of claim 19 wherein the kit of parts further comprises an axle member and further comprising the step of concentrically disposing the axle member through the base and the upper panel for rotating the praxinoscope.

21. A praxinoscope formed according to the method of claim 17.

22. A kit of parts for forming a praxinoscope, the kit of parts comprising:

a base;

a hub with a mirrored surface and means for forming a plurality of facets in the hub wherein the facets have narrowed bottom portions, widened top portions, and wedge-shaped body portions therebetween; and means for securing the bottom portions of the facets of the hub to the base to retain the hub in a faceted, conical configuration with the facets angled toward the base;

whereby, when the base and the hub are secured together to form a praxinoscope, perceived animation can be achieved by disposing a plurality of images on the base concentric with the hub and a rotation of the praxinoscope.

23. The kit of parts of claim 22 wherein the hub is formed from a single panel of material and wherein the means for forming a plurality of facets in the hub comprise bending guides for guiding in a folding of the panel of material to form the facets.

24. The kit of parts of claim 22 wherein the means for securing the bottom portions of the facets of the hub to the base comprises a plurality of teeth that project from the bottom portions of the facets in combination with a plurality of correspondingly spaced apertures disposed in a ring shape in the base for receiving the teeth.

* * * * *